(12) United States Patent
Tanaka et al.

(10) Patent No.: US 7,488,214 B2
(45) Date of Patent: Feb. 10, 2009

(54) MEMORY CARD CONNECTOR

(75) Inventors: Hirohisa Tanaka, Tsu (JP); Yutaka Nakamura, Kyoto (JP)

(73) Assignees: Matsushita Electric Works, Ltd., Kadoma-shi (JP); Matsushita Electric Industrial Co., Ltd., Kadoma-shi (JP)

( * ) Notice: Subject to any disclaimer, the term of this patent is extended or adjusted under 35 U.S.C. 154(b) by 0 days.

(21) Appl. No.: 11/659,467

(22) PCT Filed: May 10, 2006

(86) PCT No.: PCT/JP2006/309395

§ 371 (c)(1), (2), (4) Date: Feb. 6, 2007

(87) PCT Pub. No.: WO2006/121071

PCT Pub. Date: Nov. 16, 2006

(65) Prior Publication Data

US 2007/0291525 A1    Dec. 20, 2007

(30) Foreign Application Priority Data

May 12, 2005   (JP) .............................. 2005-140110

(51) Int. Cl.
*H01R 24/00*   (2006.01)

(52) U.S. Cl. .................................................. 439/630
(58) Field of Classification Search .......... 439/630–632
See application file for complete search history.

(56) References Cited

U.S. PATENT DOCUMENTS

| 6,522,552 B1* | 2/2003 | Lee | 361/752 |
| 2001/0006902 A1* | 7/2001 | Ito | 455/558 |

FOREIGN PATENT DOCUMENTS

| JP | 3-194680 | 8/1991 |
| JP | 2002-279377 | 9/2002 |
| JP | 2004-310457 | 11/2004 |
| JP | 2005-26016 | 1/2005 |

* cited by examiner

*Primary Examiner*—Truc T Nguyen
(74) *Attorney, Agent, or Firm*—Edwards Angell Palmer & Dodge LLP

(57) ABSTRACT

A compact memory card connector with an extended communication distance is provided. This connector has a loading port at its one end, through which a memory card can be accommodated therein. The connector is equipped with a base made of an electrical insulating material, a plurality of contacts arranged on the base so as to electrically contact connecting terminals of the memory card inserted in the connector, and an antenna block, which houses a secondary antenna and is slidable in a direction of inserting the memory card into the connector.

8 Claims, 6 Drawing Sheets

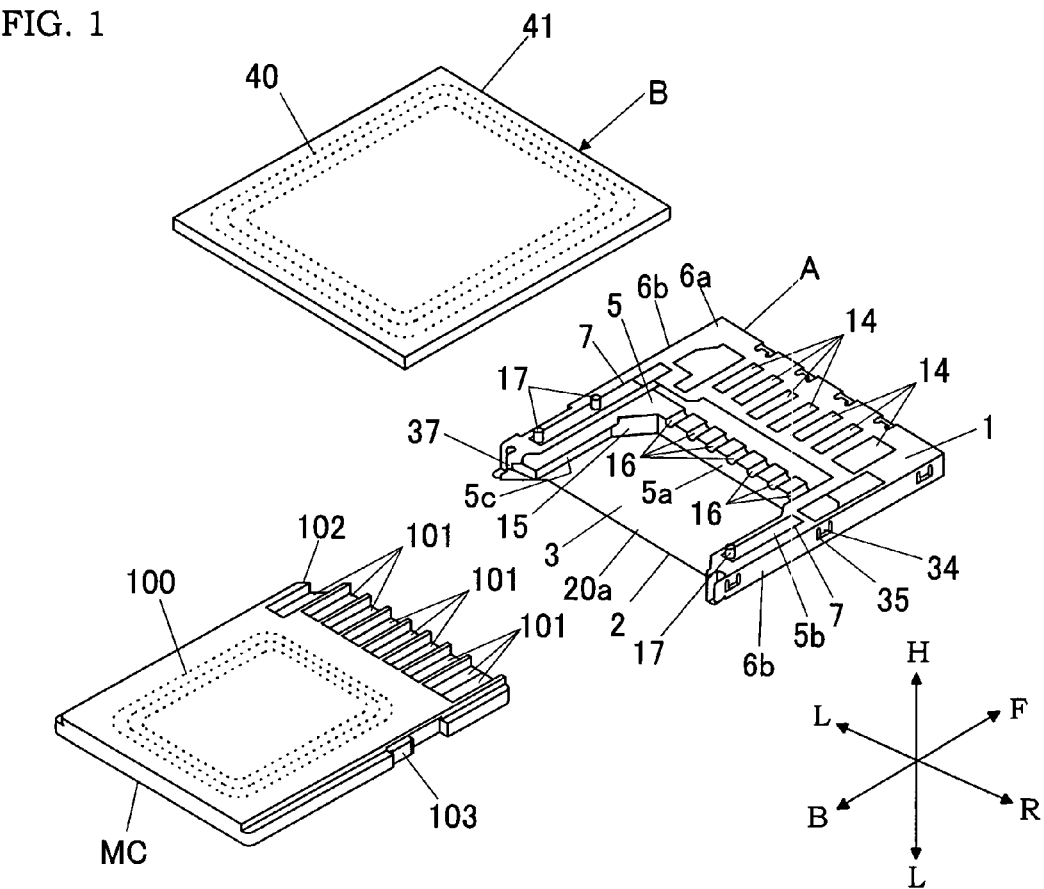
FIG. 1
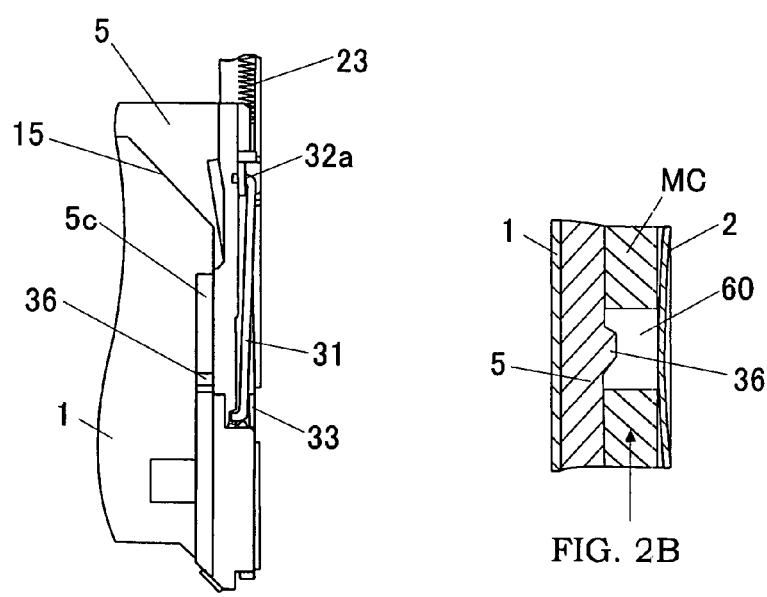
FIG. 2A
FIG. 2B

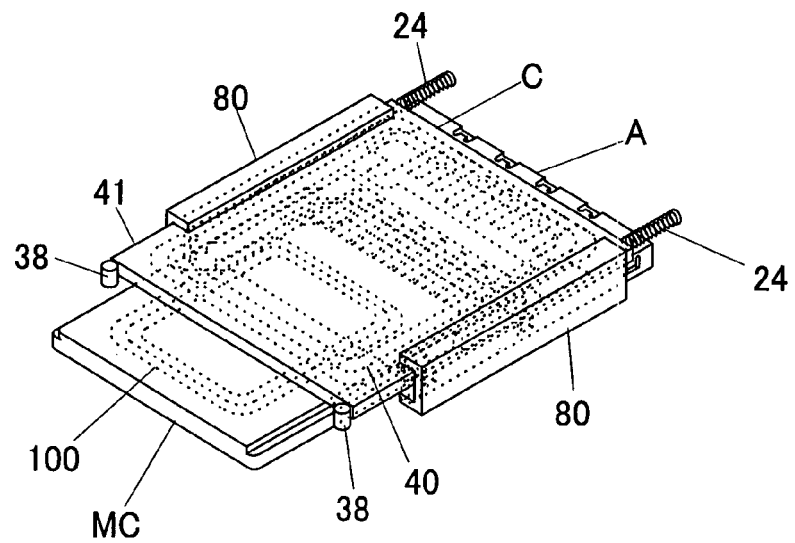
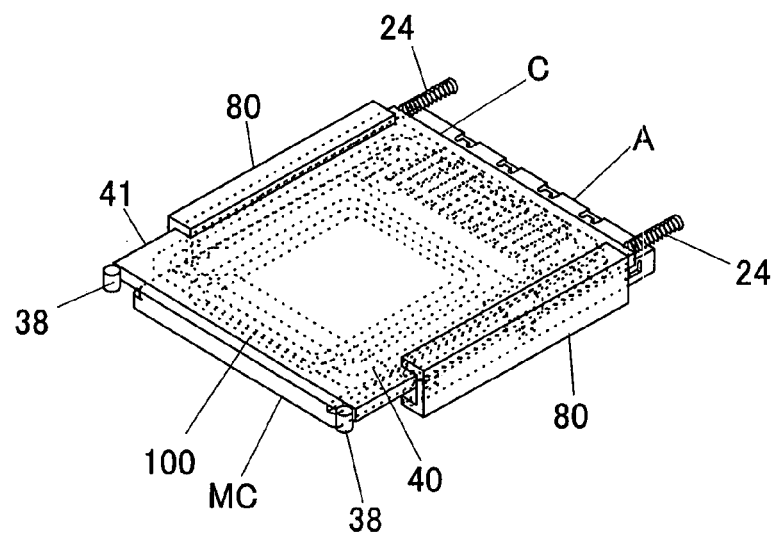
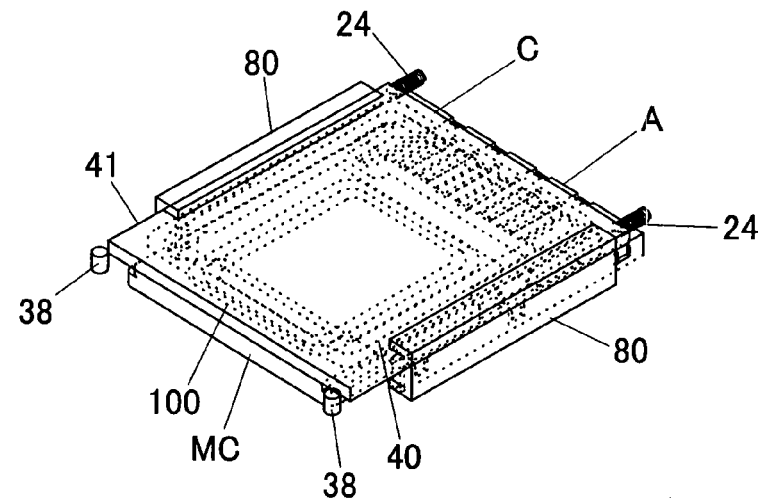

MEMORY CARD CONNECTOR

BACKGROUND OF THE INVENTION

1. Field of the Invention

The present invention relates to a connector, into which a memory card having a non-contact communication function can be inserted.

2. Description of the Related Art

In recent years, as a data storing means of electronic devices such as digital cameras and mobile phones, memory cards having a built-in nonvolatile memory such as flash memory, for example, "SD Memory Card" and "MultiMedia Card" are rapidly becoming pervasive. For example, a connector for this kind of memory card is disclosed in Japanese Patent Early Publication No. 2005-26016. This connector is formed with a housing having a loading port at its one end, through which the memory card can be inserted into the connector, a plurality of contacts configured to contact connecting terminals of the memory card inserted in the housing, a slide member that is slidable in the housing in synchronization with the memory card inserted from the loading port, and a bias spring configured to provide a spring biasing force to the slide member in a direction of pulling out the memory card.

By the way, it is expected that a compact memory card (e.g., "smart SD") having an IC card function for transmitting and receiving data to and from the outside by non-contact communication becomes pervasive in the future. However, as a result of the compact size of the memory card itself, an antenna built in this memory card is inevitably small. Therefore, it is an important subject for study to extend a communication distance. For example, Japanese Patent Early Publication No.2002-279377discloses an adaptor for a plug-in type IC card. This adaptor has a substantially same shape as a conventional credit card, and an antenna coil is disposed inside to extend the communication distance.

However, because the adaptor itself has a substantially same size as the credit card, it is needed to mount a connector having a shape and a size corresponding to the adaptor in an electric appliance. For this reason, there are problems in that it becomes necessary to newly design a connector configuration suitable for the adaptor, and mounting such an adapter in the electric appliance leads to an increase in size of the electric appliance in itself.

SUMMARY OF THE INVENTION

Therefore, a primary concern of the present invention is to provide a compact memory card connector, which has the capability of extending communication distance.

That is, the memory card connector of the present invention has a loading port at its one end, through which a memory card with a primary antenna can be accommodated therein, and includes: base made of an electrical insulating material;
- a plurality of contacts arranged on the base so as to electrically contact connecting terminals of the memory card inserted in the connector; and
- an antenna block, which houses a secondary antenna and is slidable in a direction of inserting the memory card into the connector.

According to the connector of the present invention, the antenna block having the secondary antenna is slidable in the insertion direction of the memory card, and the primary antenna of the memory card is in a face-to-face relation with the secondary antenna of the antenna block in a state of inserting the antenna built-in type memory card in the connector. Therefore, the communication distance of the memory card can be extended by use of the secondary antenna. In addition, as compared with the case of mounting a connector, into which an adaptor having a substantially same size as a credit card can be inserted, in an electric appliance, it is possible to remarkably downsize the connector in itself. Therefore, the connector becomes appropriate for electric appliances attaching great importance to portability such as mobile phones and notebook computers.

The memory card connector mentioned above may include a slide member, which is connected to the antenna block and supported to be slidable relative to the base, and wherein the slide member slides together with the antenna block in synchronization with the insertion of the memory card through the loading port. In this case, because the slide movement of the antenna block relative to the base is stably obtained by use of the slide member, the positional relation between the secondary antenna of the antenna block and the antenna of the memory card inserted in the connector can be reliably repeated. Especially, as a practical configuration of the slide member, it is preferred that the slide member is configured in a substantially C shape with a pair of arms, and the antenna block is connected to the slide member through projections formed on the arms, as described in detail in a first embodiment of the present invention.

In addition, the slide member may be biased in a direction of pulling out the memory card from the memory card connector by a biasing means such as a coil spring. In this case, the slide member can be kept in place when the memory card is not inserted in the connector. Therefore, the positional relation between the memory card and the slide member can be accurately repeated every time when inserting the memory card. Moreover, there is another advantage in that the memory card can be readily removed from the connector by help of the biasing force of the biasing means.

As described above, from the viewpoint of stably achieving the extension of communication distance of the memory card by non-contact communication the secondary antenna is may be housed in the antenna block to be in a face-to-face relation with the primary antenna in a state of accommodating the memory card in the memory card connector.

The connector may further include a locking means configured to provide a locking state of inhibiting a movement of the slide member in a direction of pulling out the memory card from the memory card connector when the slide member moves in the insertion direction of the memory card and reaches a required position in the memory card connector, and wherein the locking state is released by further moving the slide member in the insertion direction of the memory card. In this case, the locking state reliably prevents an accidental falling of the memory card from the connector. In addition, since the locking state can be readily released by the user, there is another advantage of facilitating the operation of removing the memory card from the connector.

As an exemplary embodiment for achieving a further improvement in communication distance of the memory card, the second antenna may be formed to face the primary antenna of the memory card in the locking state of the slide member, and encompass a projection range of the primary antenna of the memory card in the facing direction.

In addition, the antenna block may include an electronic part for regulating a resonance frequency of the secondary antenna. According to a constant of the electronic part, the resonance frequency of the secondary antenna can be matched with the frequency of the memory card during the non-contact communication. In addition, it is possible to downsize the antenna block by mounting the electronic part.

As another embodiment for actualizing the slide movement of the antenna block in the memory card connector of the present invention, the connector may include a support member configured to support the antenna block to be slidable in the insertion direction of the memory card, and a biasing means configured to bias the antenna block in a direction of pulling out the memory card from the memory card connector. As in the above-described case, the facing relation between the secondary antenna of the antenna block and the antenna of the memory card can be reliably repeated. In addition, when a stopper is formed at the vicinity of the loading port to limit a movement of the antenna block in the pulling-out direction of the memory card, the ease of removing the memory card from the connector can be further improved.

Further characteristics of the present invention and advantages brought thereby will become more apparent from the best mode for carrying out the invention described below.

BRIEF EXPLANATION OF THE ATTACHED DRAWINGS

FIG. 1 is an exploded perspective view of a memory card connector according to a first embodiment of the present invention;

FIGS. 2A and 2B are top and cross-sectional views of a part of the connector, respectively;

FIGS. 8A to 8C are perspective views showing a procedure of inserting the memory card in the connector of FIG. 7;

DETAILED DESCRIPTION OF EXEMPLARY EMBODIMENTS

A memory card connector of the present invention, which is suitable for use for a memory card with an IC card function for transmitting and receiving data to and from the outside by non-contact communication through a built-in antenna, is explained in detail according to preferred embodiments. In the attached drawings, an "HL"direction means a high and low direction. A "FB"direction means a forth and back direction (a direction of inserting and pulling out the memory card). A "LR"direction means a left and right direction.

First Embodiment

As shown in FIG. 1, a memory card MC used in this embodiment has a structure in which an antenna (a loop coil) 100 and an integrated circuit (IC) are built in a conventional SD Memory Card. The memory card MC is formed in a substantially rectangular thin plate, and has a plurality of (nine) connecting terminals 101 arranged in parallel at its front end. The numeral 102 designates an inclined edge formed at a corner of the front end of the memory card MC to prevent an improper insertion of the memory card. At the left lateral margin of the memory card MC, there is a locking notch (not shown) dented in a rectangular shape at a position backward from the inclined edge 102. In addition, the numeral 103 designates a write-protection switch provided at the right lateral margin of the memory card MC to be switchable between a data writable state and a write inhibitstate by manually sliding a knob back and forth.

Figure 3:
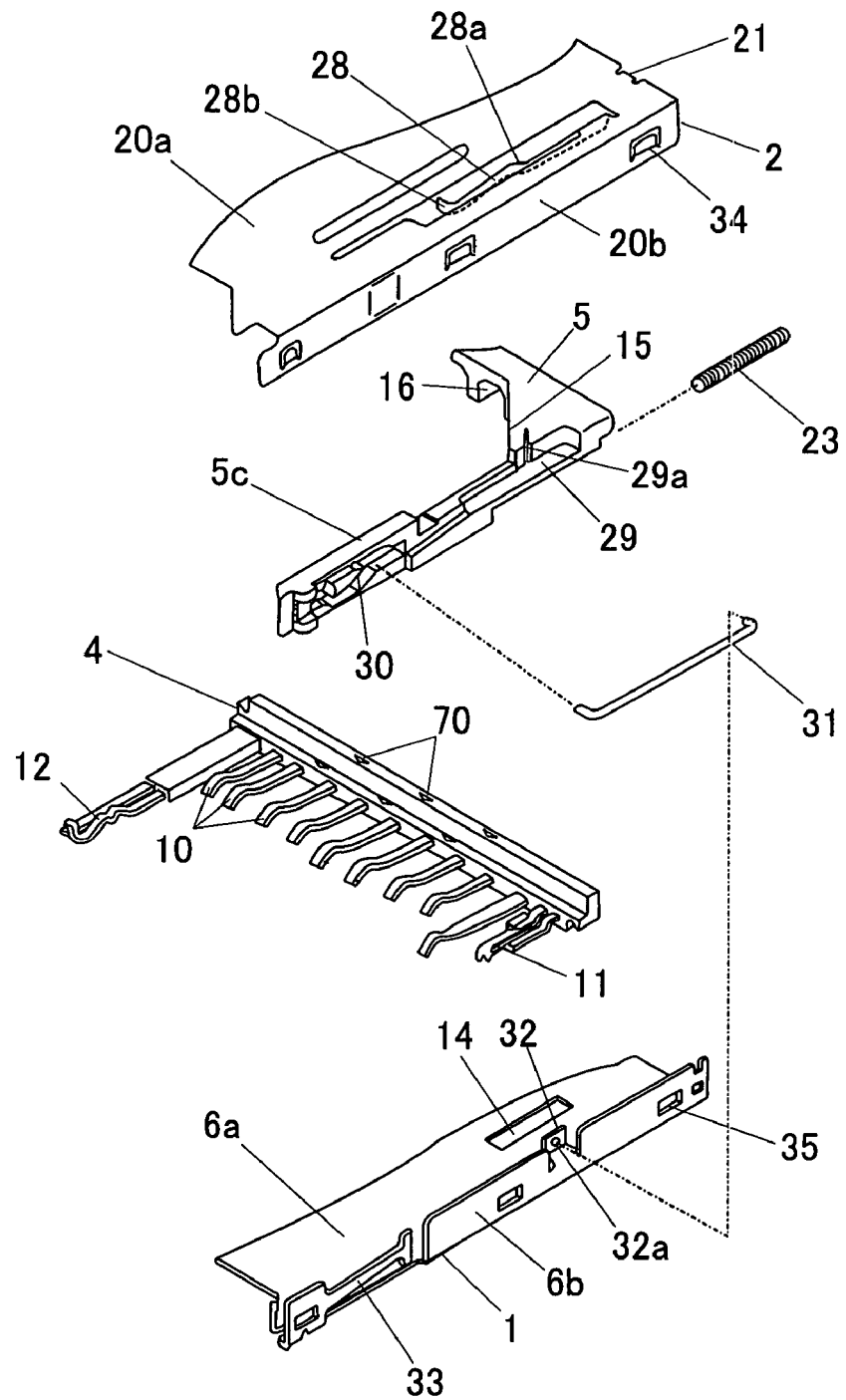
FIG. 3 is an exploded perspective view of a part of the connector.

The memory card connector of this embodiment has a base body A, in which the memory card MC is detachably inserted, and an antenna block B for providing a secondary antenna 40 at a position facing the antenna 100 of the memory card MC inserted in the base body A. The base body A has a base shell 1 and a cover shell 2, which are produced by punching and bending a thin stainless steel sheet. The cover shell 2 is joined with the base shell 1 to form a flat box having a loading port 3 at its one end, through which the memory card MC can be inserted therein. The base body A also has a contact block 4 (ref. FIG. 3) for supporting a plurality of contacts 10 therein. In addition, a slide member 5 is supported in the base body A to be slidable in a direction of inserting and pulling out the memory card MC.

As shown in FIG. 1, the base shell 1 is provided with a flat plate 6a formed in a substantially C shape, and a pair of side walls 6b hanging from the left and right lateral margins of the flat plate. The forward and backward ends of the base shell 1 are opened. In the drawings, the numeral 14 designates release holes formed in the flat plate 6a. When the memory card. M is inserted in the connector, these release holes prevent that the contacts 10 pushed upward by the memory card contact the base shell 1. In addition, the numeral 32 designates an L-shaped piece formed at one of the side walls 6b (the left side wall 6b in FIG. 1) of the base shell 1 by cutting an intermediate portion in the back and forth direction and bending it toward the inside, as shown in FIG. 3. A pin 31 for limiting a movement of the slide member 5 in the back and forth direction is supported at its one end by the L-shaped piece 32 That is, the L-shaped piece 32 has a pivot hole 32a in its standing portion, and the one end of the pin 32 is pivotally supported in the pivot hole 32a. On the other hand, the opposite end of the pin 32 is engaged to be movable in a heart cam groove portion 30 described later, which is formed in an arm portion 5c of the slide member 5. That is, a pressure spring piece 33 is formed at the side wall 6b of the base shell 1 in the vicinity of the loading port 3 by cutting and bending. As shown in FIG. 2A, this pressure spring piece 33 pushes the pin 31 toward the side of the arm portion 5c of the slide member 5, so that the opposite end of the pin 31 can be inserted in the heart cam groove portion 30.

On the other hand, the cover shell 2 is provided with a flat plate 20a formed in a substantially rectangular shape, and a pair of side walls 20b formed by bending left and right lateral margins of the flat plate. At a side of the flat plate 20a opposed to the loading port 3, there are projecting pieces 21, which are formed by bending to be spaced from each other by a required interval. These projecting pieces 21 are press-fitted in press-fit holes 70 formed in contact block 4 at the time of joining the cover shell 2 with the base shell 1, so that the contact block 4 is fixed to the cover shell. In addition, both of the side wall 20b of the cover shell 2 has elastic engagement pieces 34, which are formed by means of cutting and bending, and located at positions corresponding to a plurality of engagement holes 35 (three in FIG. 1) formed in the side walls 6b of the base shell 1.

Figure 4:
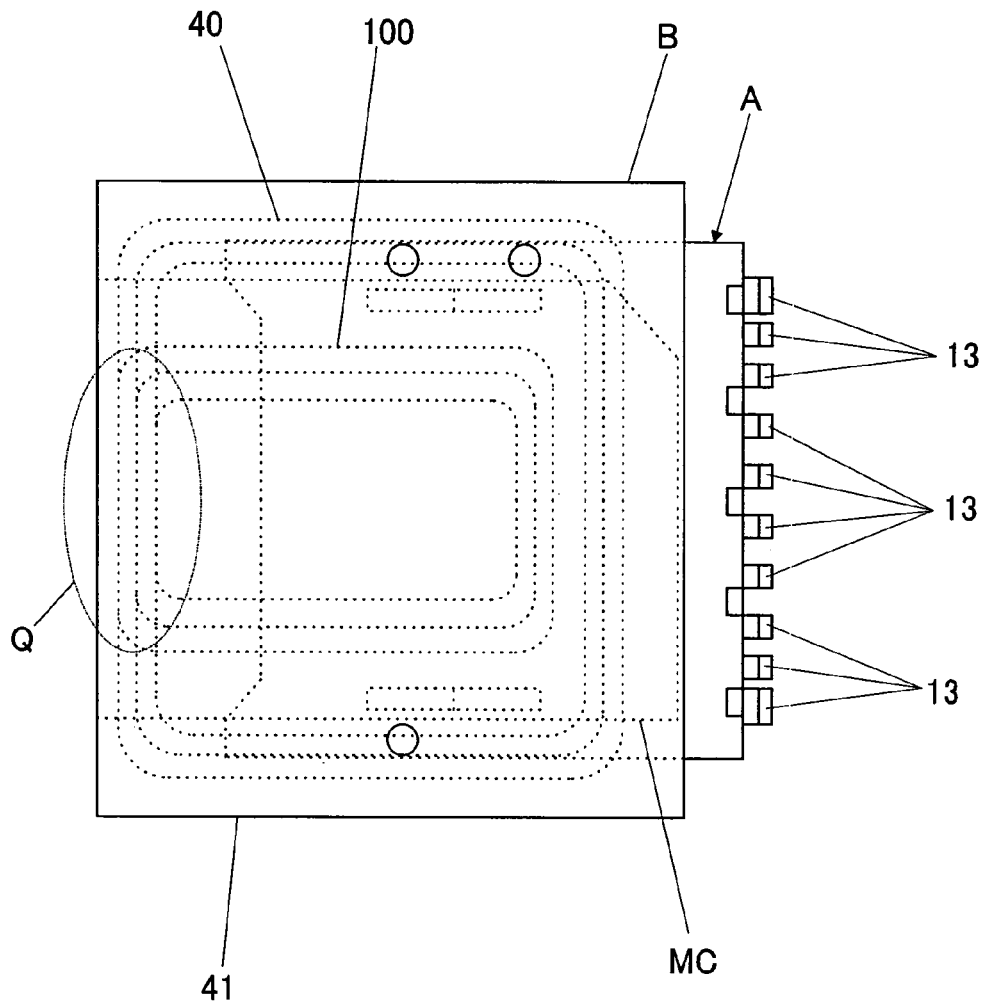
FIG. 4 is a plan view showing a state of inserting a memory card in the connector.

As shown in FIG. 3, the contact block 4 has a plurality of contacts 10, which are contactable with connecting terminals 101 disposed in parallel of the memory card MC when the memory card MC is inserted in the connector, a switch piece 11 for detecting the insertion of the memory card MC, and a switch piece 12 for detecting a position of the write-protection switch 103. These contacts and the switch pieces are insert molded into a base made of a resin. The contact block 4 is disposed in the base body A such that the contacts 10 and the switch pieces (11, 12) project toward the side of the loading port 3. In addition, as shown in FIG. 4, the contact block 4 has soldering terminal portions 13 projecting in an opposite direction to the side of the loading port 3. These soldering terminal portions 13 are soldered with a circuit board and so on. The switch piece 11 is located at a position facing the inclined edge 102 of the memory card MC, and the switch piece 12 is located at a position corresponding to the write-protection switch 103 of the memory card MC.

The slide member 5 is a molded product of a synthetic resin, and formed in a substantially C shape by a base portion 5a which can abut against the front end of the memory card MC, and a pair of arm portions (5b, 5c) projecting from both left and right ends of the base portion 5a. The numeral 15 designates an inclined surface formed at a corner portion between the base portion 5a and one of the arm portions 5c. The inclined surface 15 can be fitted to the inclined edge 102 of the memory card MC. In the drawings, the numeral 16 designates a plurality of ditches formed in the base portion 5a. The contacts 10 of the contact block 4 are allowed to project toward the side of the loading port through the ditches of the slide member 5.

The arm portions (5b, 5c) of the slide member 5 are used to guide the left and right lateral margins of the memory card MC. The arm portion 5c guides the lateral margin having the locking notch 102 of the memory card MC. In addition, as shown in FIG. 2A, the arm portion 5c has a mountain-like projection 36, which can project into the locking notch 60 of the memory card MC when the front end of the memory card MC abuts against the base portion 5a of the slide member 5. Each of the arm portions (5b, 5c) of the slide member 5 also has a slot (not shown) for receiving a coil spring 23. One end of the coil spring 23 is abutted at an end portion of the slot of the slide member 5, and the other end of the coil spring 23 is supported by the base body A. Thus, since the arm portions 5b, 5c equally receive elastic repulsion forces of the coils springs 23, the slide member 5 can smoothly slide in the base body A in the direction of inserting and pulling-out the memory card.

Figure 5:
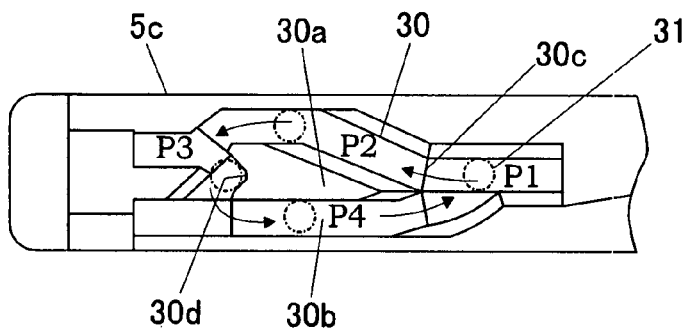
FIG. 5 is an enlarged view of a heart cam groove portion of the connector.

As described above, the heart cam groove portion 30 is formed in the outer side surface of the arm portion 5c of the slide member 5. As shown in FIG. 5, this heart cam groove portion 30 has a heart cam 30a and a guide groove 30b. The one end of the pin 31 is engaged in the guide groove 30b to be movable in the heart cam groove portion 30 in synchronization with the slide movement of the slide member 5.

In addition, as shown in FIG. 3, a locking piece 28 for preventing falling of the memory card MC from the connector is formed by cutting and bending a part of the flat plate 20a of the cover shell 2. That is, the locking piece 28 has a coupling end coupled to the flat plate 20a, and a free end projecting from the flat plate 20a to be flexible in the left and right direction. The numeral 28a designates a step portion formed at a substantially center position in the longitudinal direction of the locking piece 28 such that the free end of the locking piece 28 is located at the inside of the base body A than the coupling end. In addition, the numeral 28b designates a locking claw curved toward the inside of the base body A at the free end of the locking piece 28. On the other hand, the arm portion 5c of the slide member 5 has a concave 29, in which the locking piece 28 having the locking claw 28b can be accommodated in a state of installing the slide member 5 on the cover shell 2.

The antenna block B is provided with a secondary antenna 40 of a loop-like coil, which is formed in a spiral shape by use of a strip-like conductive material, and a carrier 41, which is a synthetic resin molded article having a rectangular flat shape. The secondary antenna 40 is insert molded into the carrier 41. As described later, when the slide member 5 is in a locking position, the secondary antenna faces the antenna 100 of the memory card MC. In addition, the secondary antenna 40 is designed to have a size and a shape suitable for encompassing a projection range of the antenna 100 of the memory card MC in the facing direction (i.e., a direction vertical to the page space of FIG. 4). In a region shown by an ellipse Q of FIG. 4, which is the plan view observed from above, the antenna 100 of the memory card MC is partially overlapped with the secondary antenna 40 of the antenna block B.

The antenna block B having the above-described structure is connected to projections 17 formed on both of the arm portions (5b, 5c) of the slide member 5. These projections 17 are integrally formed with the slide member 5, and exposed through slide slots 7 formed in the base shell 1. That is, by securing the carrier 41 of the antenna block B to the projections, 17 projecting through the slide slots 7 by an appropriate means such as swaging, welding and bonding, the antenna block B becomes slidable together with the slide member 5 relative to the base body A.

Next, a procedure of inserting the memory card MC into the connector of this embodiment is explained. In a state that the memory card MC is not inserted, the slide member 5 with the antenna block B receives the elastic repulsion force of the coil spring 23, and therefore is kept at a position close to the loading port 3. In this state, since top ends of the arm portions (5b, 5c) of the slide member 5 abut against stopper pieces 37 formed at end portions of the base shell 1, an excessive movement of the slide member 5 is limited. At this time, one end of the pin 31 is positioned at a right end (P1) of the guide groove 30b of the heart cam groove portion 30, as shown in FIG. 5. In addition, the locking claw 28b of the locking piece 28 abuts against a vertical wall 29a formed in the concave 29, and is restricted so as not to project into an accommodating space for memory card.

Figure 6A:
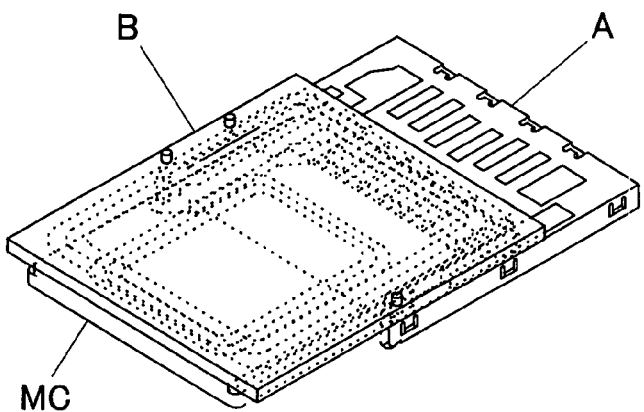
FIGS. 6A to 6C are perspective views showing a procedure of inserting the memory card in the connector of FIG. 1.

In this state of the connector, when the memory card MC is properly inserted through the loading port 3, as shown in FIG. 6A, the memory card MC is guided by the slide member 5 to move toward the interior of the connector. When the memory card MC is further pushed into the connector, the inclined edge 102 of the memory card MC comes in contact with the inclined surface 15 of the slide member 5, and at the same time the front end of the memory card MC comes in contact with the base portion 5a of the slide member 5. The slide member 5 is pushed against the elastic repulsion force of the coil spring 23. In addition, the memory card MC climbs over the mountain-like projection 36 formed on the arm portion 5c, so that the mountain-like projection 35 is put in the locking notch 60 of the memory card MC, as shown in FIG. 2B. The mountain-like projection 36 is designed to have a gentle slope such that the memory card MC smoothly inserted in the connector by climbing over the mountain-like projection 36.

Figure 6B:
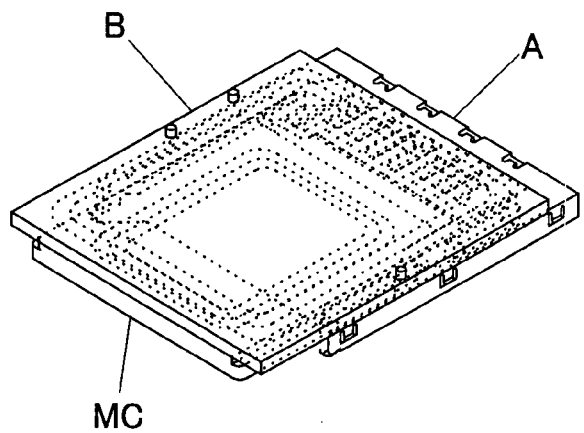

When the memory card MC is further pushed in, the one end of the pin 31 is guided by a bumpy surface 30c of the bottom of the guide groove 30b of the heart cam grove portion 30 to move toward the guide groove 30b (P2 in FIG. 5) located at the upper side of the heart cam 30a. When the memory card MC reaches a required position in the connector, and the base portion 5a of the slide member 5 comes close to the base of the contact block 4, the one end of the pin 31 is located at the left end (P3 in FIG. 5) of the guide groove 30b, so that a further insertion of the memory card MC into the connector is restricted. At this position, when the external force pushing the memory card MC into the connector is removed, the elastic repulsion force of the coil spring 23 acts in a direction of pushing back the slide member 5 together with the memory card MC toward the side of the loading port 3. However, the one end of the pin 31 is guided by the guide groove 30b to fit into a pocket 30d of the heart cam 30a. As a result, the movement of the slide member 5 toward the side of the loading port 3 is restricted, and the memory card MC is held in the connector. In addition, when the slide member 5 reaches this position, the restricted state where the locking piece 28 abuts against the vertical wall 29a formed on the arm portion 5c of the slide member 5 is released, and the locking claw 28a is allowed to project into the accommodating space for memory card of the connector, and engaged into the locking notch 60 of the memory card MC. Thus, the memory card MC is locked in the connector, as shown in FIG. 6B. In this embodiment, the heart cam groove portion 30, the pin 31 and the locking piece 28 constitute a locking mechanism. In this locking state, the contacts 10 projecting toward the side of the loading port 3 through the ditches 16 formed in the slide member 5 contact the connecting terminals 101 of the memory card MC inserted.

Figure 6C:
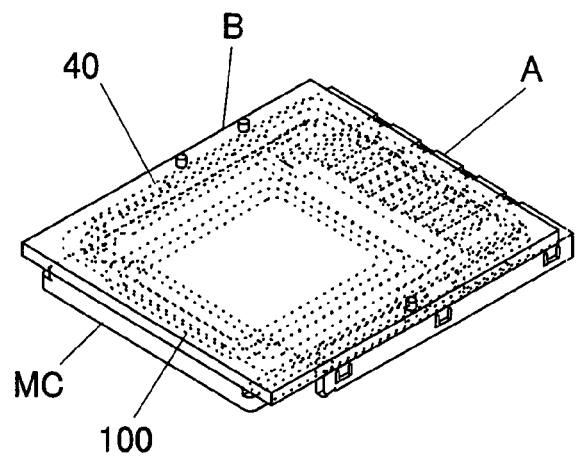

In the case of removing the memory card MC from the connector, it is needed to push a part of the memory card MC, which is exposed through the loading port 3, in the insertion direction, as shown in FIG. 6C. At this time, the slide member 5 and the antenna block B also move together with the memory card MC in the insertion direction. In synchronization with this movement, the one end of the pin 31 is disengaged from the pocket 30d of the heart cam 30a, and guided into the guide groove 30b (P4 in FIG. 5) located at the lower side of the pocket 30d. When removing the external force pushing the memory card MC, the slide member 5 and the antenna block B are moved toward the side of the loading port 3 by the elastic repulsion force of the coil spring 23. By this movement, the locking claw 28b is removed from the locking notch 60 of the memory card MC, and the locking claw 28b abut against the vertical wall 29 formed in the concave 29. Thus, the connector is placed in a condition that the locking claw 28b does not project into the accommodating space for memory card, and therefore the memory card MC can be released from the locking state.

In addition, the slide member 5 and the antenna block B are moved toward the side of the loading port 3 by the elastic repulsion force of the coil spring 23 to recover the state shown in FIG. 6A. Therefore, the user can grasp a part of the memory card MC with the fingertips, and easily pull it out from the connector.

As described above, when the memory card MC is inserted in the connector of this embodiment, the communication distance of the memory card MC can be extended by the secondary antenna 40 of the antenna block B located at the position facing to the memory card MC. In addition, since the basic structure of the base body A can be almost the same as that of a conventional memory card connector, and the memory card connector of this embodiment can be obtained by connecting the antenna block B to the slide member 5 of the base body A, it is not necessary to design a new connector configuration from the ground up. As a result, it is possible to remarkably save the development and production cost of the connector. Moreover, since the antenna block B is movable in synchronization with the slide member 5, there is an advantage of providing the easiness of handling the memory card, which is equivalent to the conventional one, without the insertion of the memory card MC into the connector being obstructed by the antenna block B.

In conclusion, since the memory card with the built-in antenna becomes available with use of the basic structure of the conventional memory card connector, it is possible to prevent an increase in production cost, and provide the connector for the built-in antenna type memory card with the advantages of conventional memory card connectors. In addition, when the memory card MC is in the locking state in the connector, the secondary antenna 40 is in the facing relation with the antenna 100 of the memory card MC, and also the secondary antenna 40 is designed to have a shape and a size encompassing the projection range of the antenna 100 of the memory card MC in the facing direction. Therefore, it is possible to reliably extend the communication distance by non-contact communication. It is also preferred that the antenna block B has an electronic part (e.g., chip capacitor), which is mounted on the carrier 41 to regulate a resonance frequency of the secondary antenna 40. In this case, the resonance frequency of the secondary antenna 40 can be matched with the frequency of the memory card MC during the non-contact communication according to the constant of the electronic part.

Second Embodiment

A memory card connector of this embodiment is substantially same as the first embodiment except for the following components. Therefore, the same reference numerals are added to the components common to the first embodiment, and the duplicate explanation is omitted.

Figure 7:
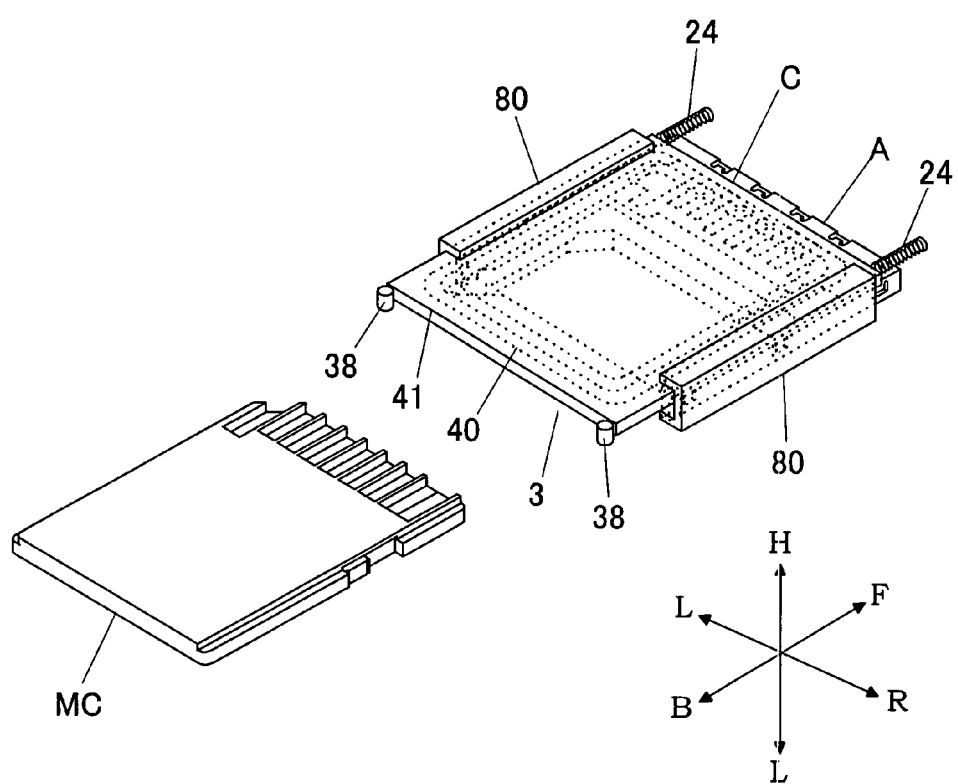
FIG. 7 is an exploded perspective view of a memory card connector according to a second embodiment of the present invention.

As shown in FIG. 7, the connector of this embodiment is characterized by comprising an antenna block C having a carrier 41 formed in a rectangular plate, a secondary antenna 40 of a loop-like coil insert molded into the carrier, a pair of support members 80 for supporting the antenna block C to be slidable relative to a base body A along a direction (FB direction) of inserting and pulling out the memory card MC, and a pair of coil springs 24 for biasing the antenna block C in the direction of pulling out the memory card MC. In brief, in the first embodiment, since the slide member 5 is connected to the antenna block B, they are integrally slidable. On the other hand, in the present embodiment, the antenna block C is slidable independently from the slide member.

Each of the supporting member 80 is a synthetic resin molded article formed in a gutter-like shape having a substantially C-shaped cross section. The left and right lateral margins of the base body A and the antenna block C are supported by inner surfaces of the supporting members 80. That is, the left and right lateral margins of the carrier 41 of the antenna block C are movably supported in grooves of the support members 80, and the base body A is fixed to the supporting members 80. An end of the respective coil spring 24 is connected to an end of the carrier 41 of the antenna block C, and the other end of the coil spring is fixed to, for example, an inner wall (not shown) of an electric appliance, in which the memory card connector is installed. Therefore, the antenna block C is elastically biased in the direction toward the loading port 3.

The carrier 41 elastically biased by the coil springs 24 can abut against a pair of regulatory projections 38 formed at the vicinity of the loading port 3 to limit a movement of the memory card MC in the pulling-out direction. For example, these regulatory projections 38 can be formed at the tips of extension pieces (not shown) extending from the base body A. The positions of the regulatory projections 38 are preferably determined such that when the memory card is in a locking state in the connector, an end portion of memory card MC is substantially flush with the end portion of the carrier 41 in the direction of inserting and pulling-out the memory card, as shown in FIG. 8B.

In the case of inserting the memory card MC in the connector of the present embodiment, the memory card MC is inserted with a proper orientation in the connector through the loading port 3, as shown in FIG. 8A. As shown in FIG. 8B, when the memory card MC reaches the position where the end portion of the memory card MC is substantially flush with the end portion of the antenna block C, the memory card MC is locked in the locking position by a locking mechanism. Thus, the insertion of the memory card MC is finished.

On the other hand, when removing the memory card MC from the connector, both of the memory card MC and the antenna block C are pushed in even further than the position of FIG. 8B against the bias forces of the coil springs 24, as shown in FIG. 8C. Thereby, according to the same mechanism as the first embodiment, the locking state is released. As a result, as shown in FIG. 8A, the end portion of the memory card MC can be sufficiently ejected from the loading port 3. The user can grasp the exposed end portion of the Memory card MC, and pull it out from the connector. At this time, since the movement of the antenna block C is limited by the regulatory projections 38, only the memory card MC can be ejected in the pulling-out direction with a larger distance than the antenna block C. Therefore, the connector of this embodiment has an advantage of further facilitating the procedure of removing the memory card MC from the connector.

In the above embodiments, it has been explained about the case of inserting the SD Memory Card with the built-in antenna and IC card function. However, the technical concept of the present invention also includes a case that a memory card such as Mini SD Card having only the IC card function without the built-in antenna is inserted in an adapter having a built-in antenna, and then the adapter is inserted in the connector of the present invention. In this case, the memory card with the primary antenna" so called in the present invention is provided by both of the memory card having only the IC card function and the adaptor having the built-in antenna. Even when the memory card is composed of the Mini SD Card and such an adapter, the communication distance of the antenna built in the adapter can be reliably extended by use of the secondary antenna of the antenna block.

INDUSTRIAL APPLICABILITY

As described above, according to the memory card connector of the present invention, the antenna block having the secondary antenna is slidable, and the primary antenna of the memory card is in a face-to-face relation with the secondary antenna of the antenna block in a state (locking state) of inserting the memory card at a required position in the connector. Therefore, the communication distance can be extended with reliability by use of the secondary antenna. In addition, since a basic design of a conventional memory card connector can be adopted, there is another advantage that it is not necessary to newly design a connector configuration from the ground up. Thus, it is expected to be put into practical use as a connector for a built-in antenna type memory card such as Smart SD Card, the demand for which is expected to increase in the future.

The invention claimed is:

1. A memory card connector having a loading port at its one end, through which a memory card with a primary antenna can be accommodated therein, wherein the memory card connector comprises:

a base made of an electrical insulating material;
a plurality of contacts arranged on said base so as to electrically contact connecting terminals of said memory card inserted in the memory card connector;
an antenna block, which houses a secondary antenna and is slidable in a direction of inserting said memory card into the memory card connector; and
a slide member connected to said antenna block and supported to be slidable relative to said base,
wherein said slide member slides together with said antenna block in synchronization with the insertion of said memory card through said loading port.

2. The memory card connector as set forth in claim 1, wherein said slide member is configured in a substantially C shape with a pair of arms, and said antenna block is connected to said slide member through projections formed on said arms.

3. The memory card connector as set forth in claim 1, further comprising a biasing means configured to bias said slide member in a direction of pulling out said memory card from the memory card connector.

4. The memory card connector as set forth in claim 1, wherein said secondary antenna is housed in said antenna block to be in a face-to-face relation with said primary antenna in a state of accommodating said memory card in the memory card connector.

5. The memory card connector as set forth in claim 1, further comprising a locking means configured to provide a locking state of inhibiting a movement of said slide member in a direction of pulling out said memory card from the memory card connector when the slide member moves in the insertion direction of said memory card and reaches a required position in the memory card connector, and wherein the locking state is released by further moving said slide member in the insertion direction of said memory card.

6. The memory card connector as set forth in claim 5, wherein said second antenna is formed to face said primary antenna of said memory card in the locking state of said slide member, and encompass a projection range of said primary antenna of said memory card in the facing direction.

7. The memory card connector as set forth in claim 1, wherein said antenna block comprises an electronic part for regulating a resonance frequency of said secondary antenna.

8. A memory card connector having a loading port at its one end, through which a memory card with a primary antenna can be accommodated therein, wherein the memory card connector comprises:

a base made of an electrical insulating material;
a plurality of contacts arranged on said base so as to electrically contact connecting terminals of said memory card inserted in the memory card connector; and
an antenna block, which houses a secondary antenna and is slidable in a direction of inserting said memory card into the memory card connector;
a support member configured to support said antenna block to be slidable in the insertion direction of said memory card;
a biasing means configured to bias said antenna block in a direction of pulling out said memory card from the memory card connector; and
a stopper formed at the vicinity of said loading port to limit a movement of said antenna block in the pull-out direction of said memory card.

* * * * *